(12) United States Patent
Bian et al.

(10) Patent No.: US 11,036,003 B2
(45) Date of Patent: Jun. 15, 2021

(54) WAVEGUIDE COUPLERS PROVIDING CONVERSION BETWEEN WAVEGUIDES

(71) Applicant: GLOBALFOUNDRIES U.S. Inc., Santa Clara, CA (US)

(72) Inventors: Yusheng Bian, Ballston Lake, NY (US); Ajey Poovannummoottil Jacob, Watervliet, NY (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 0 days.

(21) Appl. No.: 16/549,197

(22) Filed: Aug. 23, 2019

(65) Prior Publication Data

US 2021/0055478 A1 Feb. 25, 2021

(51) Int. Cl.
*G02B 6/12* (2006.01)
*G02B 6/122* (2006.01)
*G02B 6/136* (2006.01)
*G02B 6/30* (2006.01)

(52) U.S. Cl.
CPC ........... *G02B 6/1228* (2013.01); *G02B 6/136* (2013.01); *G02B 6/305* (2013.01)

(58) Field of Classification Search
CPC ....... G02B 6/1228; G02B 6/136; G02B 6/305
USPC .......................................................... 385/43
See application file for complete search history.

(56) References Cited

U.S. PATENT DOCUMENTS

2004/0114869 A1  6/2004 Fike et al.
2005/0123244 A1  6/2005 Block et al.
2011/0133063 A1* 6/2011 Ji ............................ G02B 6/124
                                                           250/227.24
2016/0103279 A1* 4/2016 Budd .................. G02B 6/1228
                                                              385/14
2017/0003451 A1* 1/2017 Ma ........................ G02B 6/125
2017/0045686 A1* 2/2017 Lee ...................... G02B 6/1228
2018/0067259 A1* 3/2018 Teng .................... G02B 6/1228
2019/0384135 A1* 12/2019 Takahashi ............. G02F 1/2257

OTHER PUBLICATIONS

Daoxin Dai, Yongbo Tang, and John E Bowers, "Mode conversion in tapered submicron silicon ridge optical waveguides," Opt. Express 20, 13425-13439 (2012).
Long Chen and Young-kai Chen, "Compact, low-loss and low-power 8×8 broadband silicon optical switch," Opt. Express 20, 18977-18985 (2012).
Po Dong, Wei Qian, Shirong Liao, Hong Liang, Cheng-Chih Kung, Ning-Ning Feng, Roshanak Shafiiha, Joan Fong, Dazeng Feng, Ashok V. Krishnamoorthy, and Mehdi Asghari, "Low loss shallow-ridge silicon waveguides," Opt. Express 18, 14474-14479 (2010).

* cited by examiner

*Primary Examiner* — Jerry M Blevins
(74) *Attorney, Agent, or Firm* — Thompson Hine LLP; Francois Pagette

(57) ABSTRACT

Structures for a waveguide coupler and methods of fabricating a structure for a waveguide coupler. A first waveguide core has a first width, a second waveguide core has a second width less than the first width, and a waveguide coupler includes first and second tapers that are positioned between the first waveguide core and the second waveguide core. The second taper is directly connected with the first taper, and the first and second tapers connect the first and second waveguide cores.

16 Claims, 5 Drawing Sheets

WAVEGUIDE COUPLERS PROVIDING CONVERSION BETWEEN WAVEGUIDES

BACKGROUND

The present invention relates to photonics chips and, more specifically, to structures for a waveguide coupler and methods of fabricating a structure for a waveguide coupler.

Photonics chips are used in many applications and systems including, but not limited to, data communication systems and data computation systems. A photonics chip integrates optical components, such as waveguides and bends, and electronic components, such as field-effect transistors, into a unified platform. Among other factors, layout area, cost, and operational overhead may be reduced by the integration of both types of components into the unified platform.

Couplers may be used in photonics chips for transferring optical signals between different waveguides. Efficient coupling between two waveguides requires conversion from the mode profile of one waveguide into the mode profile of the other waveguide. Poor modal overlap may cause coupling during the transfer to non-guided radiation modes or coupling during the transfer to unwanted guided radiation modes.

Improved structures for a waveguide coupler and methods of fabricating a structure for a waveguide coupler are needed.

SUMMARY

In an embodiment of the invention, a structure includes a first waveguide core having a first width, a second waveguide core having a second width less than the first width, and a waveguide coupler including a first taper and a second taper that are positioned between the first waveguide core and the second waveguide core. The second taper is directly connected with the first taper, and the first taper and the second taper connect the first waveguide core with the second waveguide core.

In an embodiment of the invention, a method includes forming a first waveguide core having a first width, forming a second waveguide core having a second width less than the first width, and forming a waveguide coupler including a first taper and a second taper that are positioned between the first waveguide core and the second waveguide core. The second taper is directly connected with the first taper, and the first taper and the second taper connect the first waveguide core with the second waveguide core.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
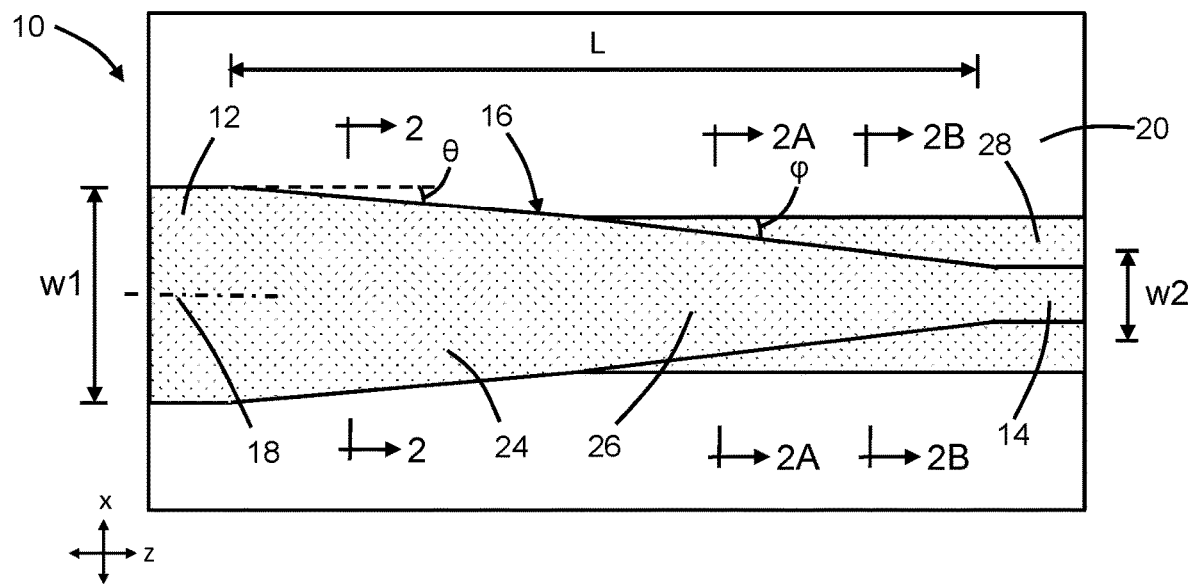
FIG. 1 is a top view of a structure for a photonics chip at an initial fabrication stage of a processing method in accordance with embodiments of the invention.

With reference to FIGS. 1, 2, 2A, 2B and in accordance with embodiments of the invention, a structure 10 includes a waveguide core 12, a waveguide core 14, and a waveguide coupler 16 providing a connection that couples the waveguide core 12 to the waveguide core 14. The waveguide cores 12, 14 and waveguide coupler 16 may be composed of single-crystal semiconductor material (e.g., single-crystal silicon), and may be arranged on a photonics chip. The waveguide cores 12, 14 and waveguide coupler 16 may extend lengthwise along a longitudinal axis 18 across a substrate, which may be a silicon-on-insulator (SOI) wafer that includes a device layer, a buried insulator layer 20, and a substrate 22. The waveguide cores 12, 14 and the waveguide coupler 16 may be formed by patterning the single-crystal semiconductor material of the device layer with lithography and etching processes that form an etch mask over the device layer and etch the masked device layer with an etching process, such as reactive ion etching. The waveguide cores 12, 14 and waveguide coupler 16 are positioned on the buried insulator layer 20, and the waveguide cores 12, 14 and waveguide coupler 16 may be coplanar (i.e., top and bottom surfaces that are coplanar or substantially coplanar). The buried insulator layer 20 may be composed of a dielectric material, such as silicon dioxide, that is arranged over the substrate 22, which may also be composed of single-crystal semiconductor material. In use, the waveguide coupler 16 may transfer a stream of optical signals from the waveguide core 12 to the waveguide core 14.

The waveguide core 12 may be a straight waveguide having substantially planar sidewalls, and the waveguide core 14 may also be a straight waveguide having substantially planar sidewalls. In particular, the waveguide core 12 may be a multi-mode waveguide, the waveguide core 14 may be a single-mode waveguide, and the waveguide coupler 16 may provide a transition that converts multi-mode optical signals guided by the waveguide core 12 to single-mode optical signals guided by the waveguide core 14. The waveguide coupler 16 may also provide a transition that converts single-mode optical signals guided by the waveguide core 14 to multi-mode optical signals guided by the waveguide core 12.

The waveguide core 12 may have a width, w1, that is capable of supporting multiple modes, including the fundamental mode and higher-order modes, for lower-loss and long-range routing of the optical signals. The waveguide core 14 may have a width, w2, that is less than the width, w1, of the waveguide core 12. The waveguide core 14 may have be capable of supporting the fundamental mode (e.g., the fundament transverse electric mode) for subsequent supply to active devices. The width, w1, of the waveguide core 12 may be greater than about 0.5 times the wavelength of the electromagnetic radiation, which may be laser-generated, contained in the optical signals. The width, w2, of the waveguide core 14 may range from about 0.1 to about 0.26 times the wavelength of the electromagnetic radiation contained in the optical signals.

The waveguide coupler 16 may include a taper 24 that is connected with the waveguide core 12 and a taper 26 that is connected with the waveguide core 14. The tapers 24, 26, which have the same or substantially the same thickness as the waveguide cores 12, 14, are directly connected with each other in an abutted fashion. Specifically, the taper 24 is directly connected at one end with an end of the taper 26 at which the tapering experiences a transition from the slope of the taper 24 to the slope of the taper 26. The taper 24 is directly connected at its opposite end with the waveguide core 12 at a transition at which the tapering onsets, and the taper 26 is directly connected at its opposite end with the waveguide core 14 at a transition at which the tapering ends. The waveguide cores 12, 14 and the tapers 24, 26 of the waveguide coupler 16 may have equal thicknesses, t1, that are equal to 0.1 to 0.2 times the wavelength of the laser-generated electromagnetic radiation contained in the optical signals.

The tapers 24, 26 of the waveguide coupler 16 are oriented relative to the longitudinal axis 18 with the tapering occurring in the same direction along the longitudinal axis 18 from the waveguide core 12 to the waveguide core 14. More specifically, the tapers 24, 26 each narrow in width in a direction along the longitudinal axis 18 from the waveguide core 12 to the waveguide core 14. The degree of tapering may be assessed relative to the longitudinal axis 18, relative to each other, or relative to the sidewalls of one or both of the waveguide cores 12, 14. Specifically, the taper 24 may narrow in width with a given slope at an angle, $\theta$, and the taper 26 may narrow in width with a given slope at an angle, $\varphi$, that is different than (i.e., not equal to) the angle, $\theta$. In an embodiment, the angle, $\varphi$, of the taper 26 may be greater than the angle, $\theta$, of the taper 24 such that the width of the taper 26 narrows at a higher rate of change as a function of position than the width of the taper 24. The taper 24 may taper with a linear width change as shown, the taper 26 may taper with a linear width change as shown, each of the tapers 24, 26 may taper with a non-linear width change, or any combination thereof.

The waveguide coupler 16 has a total length, L, that may be measured along the longitudinal axis 18 between the intersection of the taper 24 with the waveguide core 12 and the intersection of the taper 26 with the waveguide core 14. At least a portion of the waveguide coupler 16 over its length, L, is flanked by a slab layer 28 of the same constituent single-crystal semiconductor material as the waveguide coupler 16. The slab layer 28 has a thickness, t2, that is less than the thickness, t1, of the waveguide cores 12, 14 and waveguide coupler 16. The taper 26 is directly connected with the slab layer 28. In the representative embodiment, the taper 26 is directly connected with the slab layer 28 over the entire length of the taper 26 (i.e., the entire portion of the length of the waveguide coupler 16 constituted by the taper 26), and the taper 24 is not connected with the slab layer 28. The waveguide core 14 may also be directly connected with a portion of the slab layer 28 to define a rib waveguide, and the waveguide core 12 may be a ridge waveguide that is not connected with any portion of the slab layer 28.

The slab layer 28 is formed when the waveguide coupler 16 is patterned by halting the etching process before penetrating fully through the single-crystal semiconductor material of the device layer, and the formation of the slab layer 28 may require multiple lithography and etching processes. The slab layer 28 is connected with the taper 26 and the slab layer 28 may also be connected with the waveguide core 14. In the representative embodiment, the extent of the slab layer 28 associated with the taper 26 coincides with the portion of the total length, L, of the waveguide coupler 16 that is equal or substantially equal to the length of the taper 26 along the longitudinal axis 18. In the representative embodiment, the combined width of the taper 26 and the slab layer 28 is constant such that the portions of the slab layer 28 that are peripheral to the taper 26 widen and inversely taper as the taper 26 narrows in width along the longitudinal axis 18.

Figure 2:
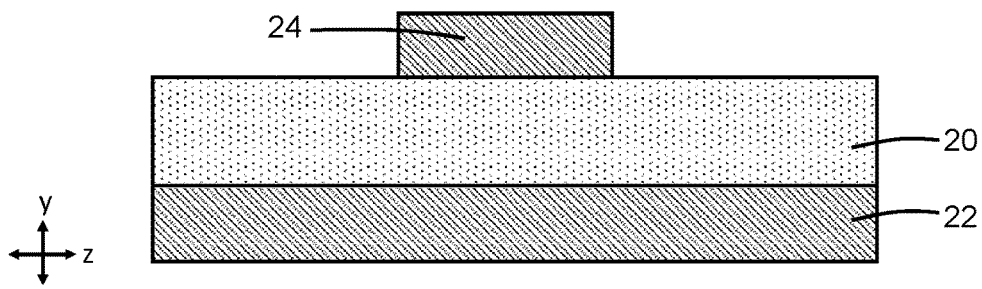
FIG. 2 is a cross-sectional view of the structure taken generally along line 2-2 in FIG. 1.
Figure 2A:
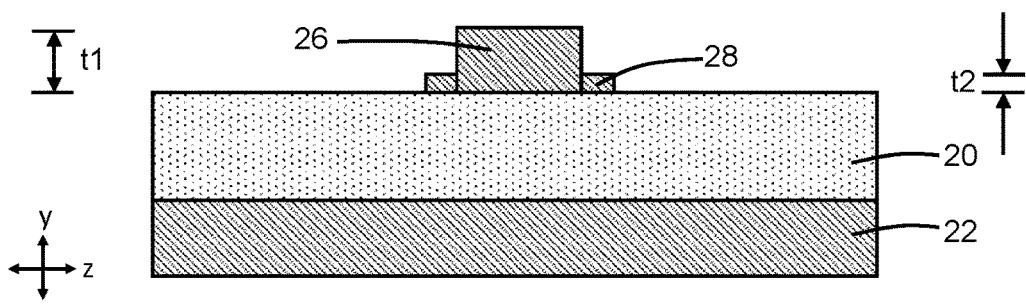
FIG. 2A is a cross-sectional view of the structure taken generally along line 2A-2A in FIG. 1.
Figure 2B:
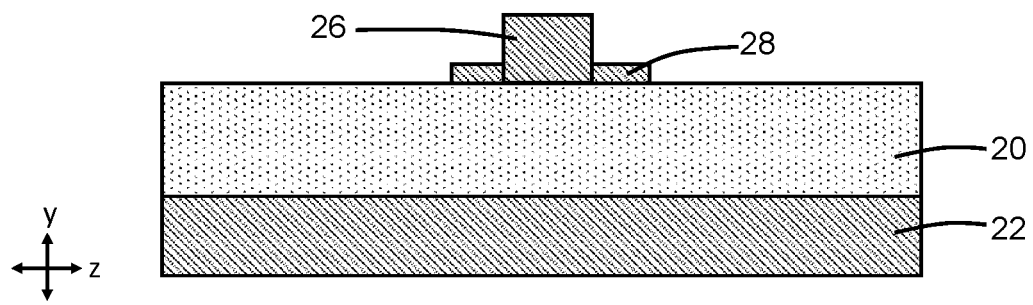
FIG. 2B is a cross-sectional view of the structure taken generally along line 2B-2B in FIG. 1.
Figure 3:
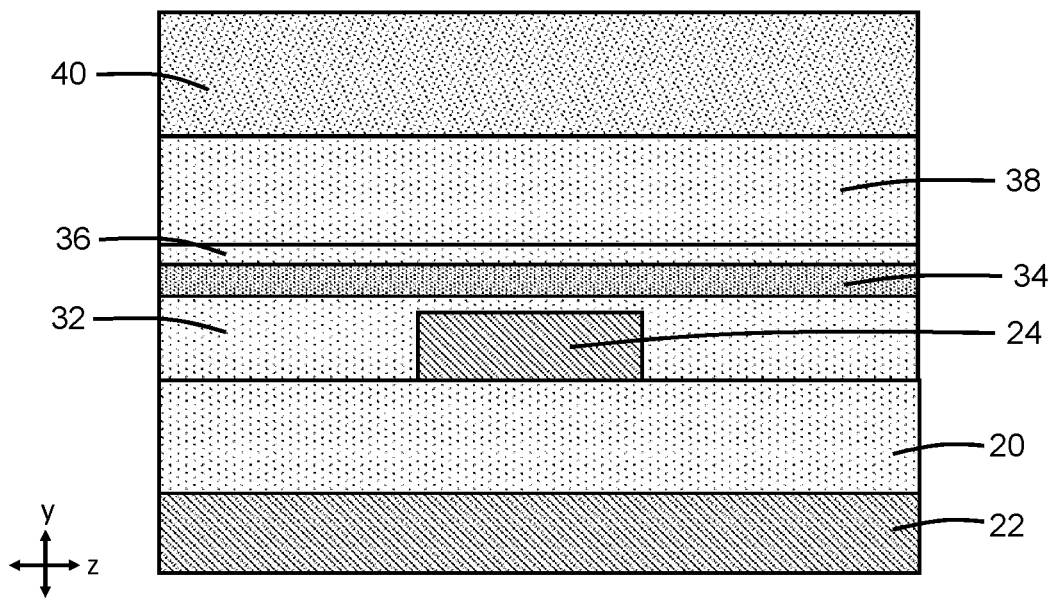
FIGS. 3, 3A, 3B are a cross-sectional view of the structure at a fabrication stage of the processing method subsequent to FIGS. 2, 2A, 2B.
Figure 3A:
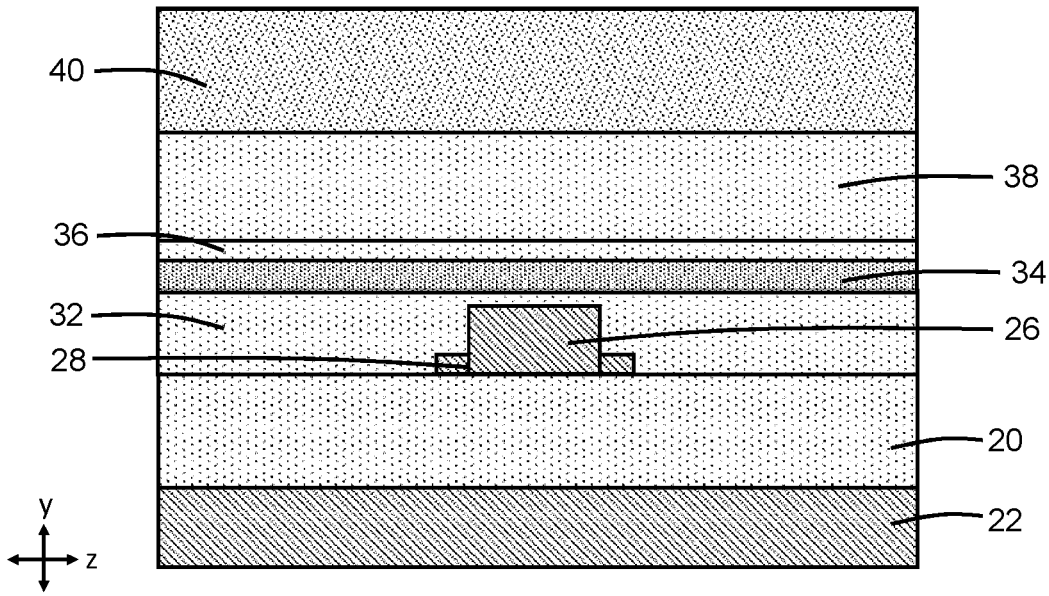
Figure 3B:
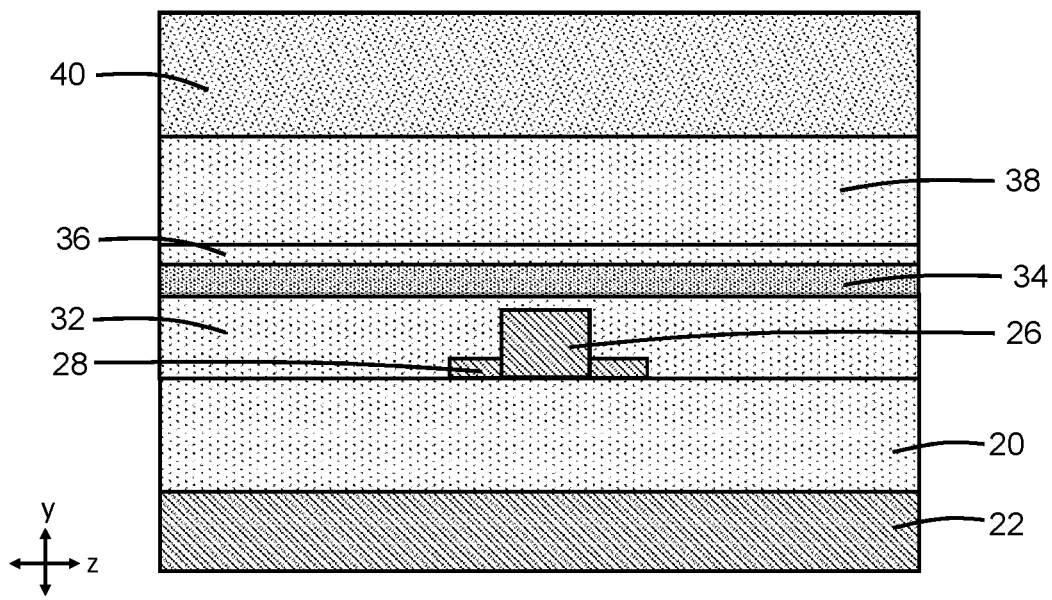
Figure 4:
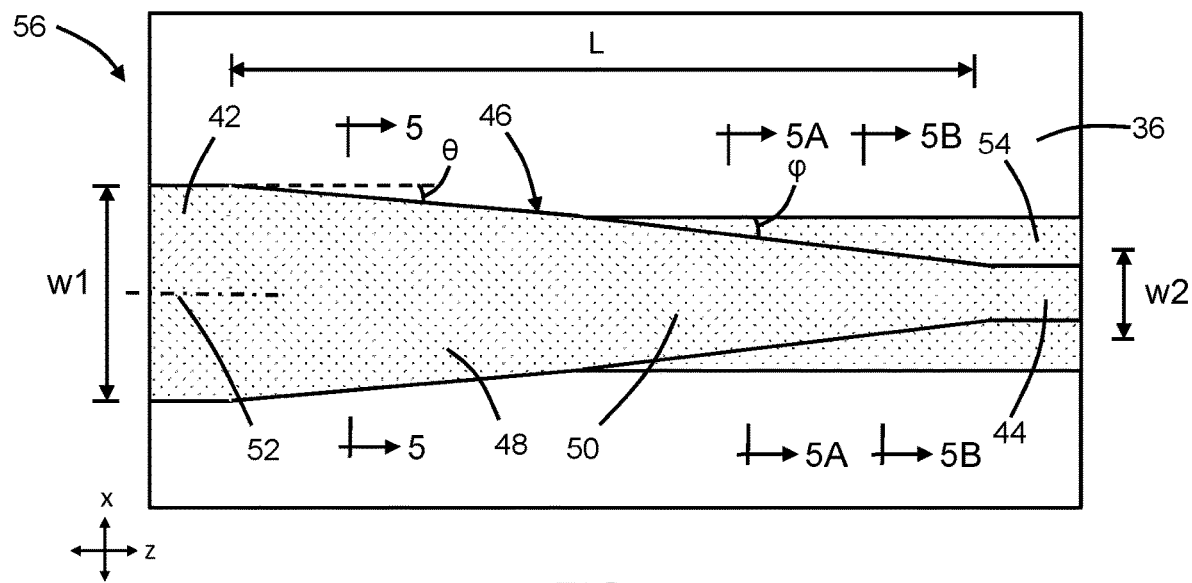
FIG. 4 is a top view of a structure for a photonics chip in accordance with alternative embodiments of the invention.
Figure 5:
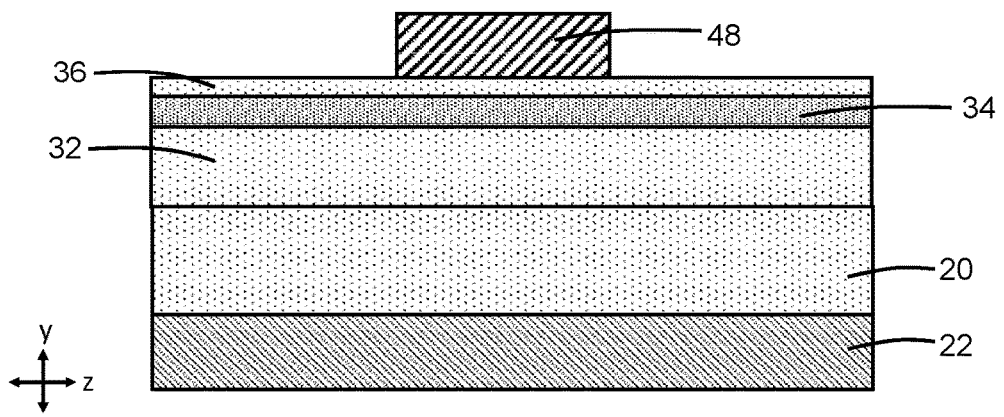
FIG. 5 is a cross-sectional view of the structure taken generally along line 5-5 in FIG. 4.
Figure 5A:
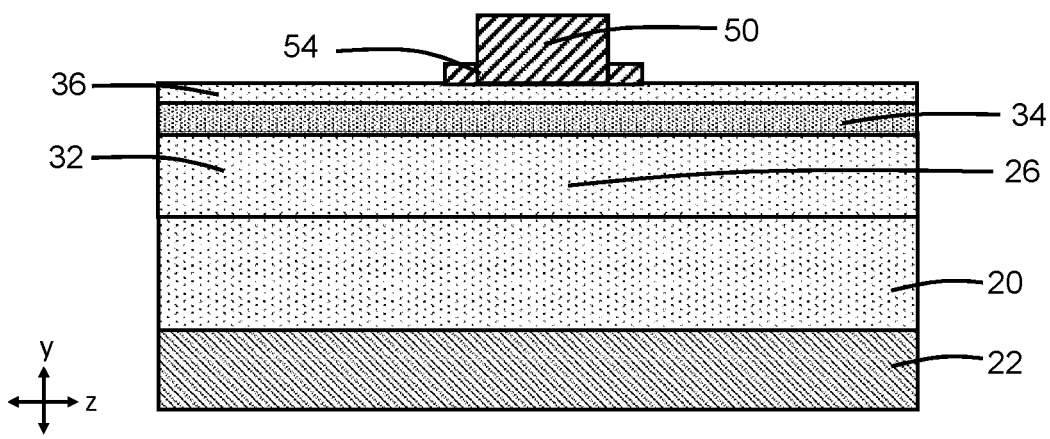
FIG. 5A is a cross-sectional view of the structure taken generally along line 5A-5A in FIG. 4.
Figure 5B:
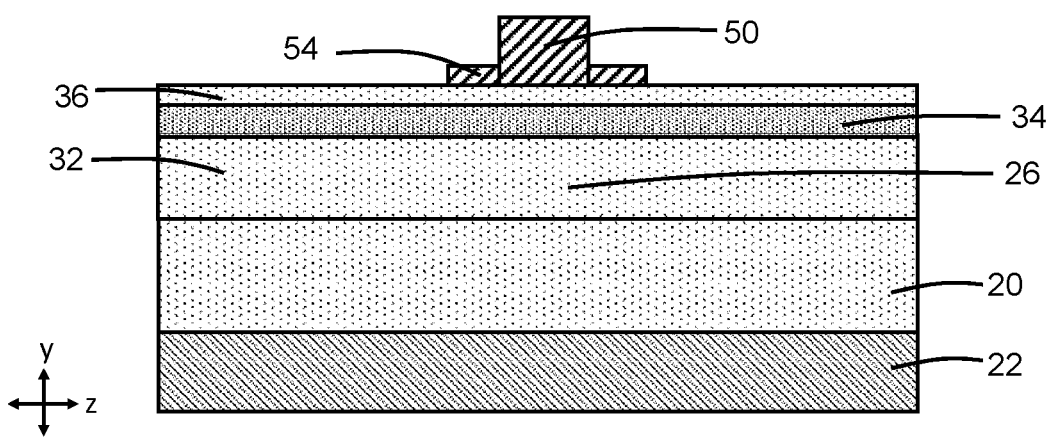
FIG. 5B is a cross-sectional view of the structure taken generally along line 5B-5B in FIG. 4.

With reference to FIGS. 3, 3A, 3B in which like reference numerals refer to like features in FIGS. 2, 2A, 2B and at a subsequent fabrication stage, layers 32, 34, 36 are formed in a heterogenous layer stack positioned over the waveguide cores 12, 14 and the waveguide coupler 16. The layers 32, 34, 36 may be composed of respective dielectric materials formed by, for example, atomic layer deposition. In an embodiment, the layers 32, 36 may be composed of silicon dioxide, and the layer 34 may be composed of silicon nitride. The waveguide cores 12, 14 and the waveguide coupler 16 may be embedded in the layer 32 and thereby surrounded on three sides by the dielectric material of layer 32. The layer 32 may be planarized with, for example, chemical mechanical polishing, following its deposition, to eliminate topography and provide a planar top surface.

A dielectric layer 38 is formed over the dielectric layer 36. The dielectric layer 38 may be composed of a dielectric material, such as silicon dioxide, deposited by chemical vapor deposition. For example, the dielectric layer 38 may be composed of silicon dioxide deposited by chemical vapor deposition using ozone and tetraethylorthosilicate (TEOS) as reactants. The dielectric layer 38 may be an interlayer dielectric layer containing contacts that extend to electronic components on the photonics chip.

A back-end-of-line stack, generally indicated by reference numeral 40, may be formed over the dielectric layer 38. The back-end-of-line stack 40 may include one or more interlayer dielectric layers composed of one or more dielectric materials, such as doped silicon oxides. The back-end-of-line stack 40 may also include metallization composed of, for example, copper, tungsten, or cobalt that may be arranged in the one or more interlayer dielectric layers and that may be coupled to the contacts in the dielectric layer 38.

With reference to FIGS. 4, 5, 5A, 5B and in accordance with alternative embodiments, a structure 56 may include waveguide cores 42, 44 and a waveguide coupler 46, which are respectively constructed similar to the waveguide cores 12, 14 and waveguide coupler 16 of structure 10 as previously described. The waveguide cores 42, 44 and waveguide coupler 46 are composed of a different material than the waveguide cores 12, 14 and waveguide coupler 16, and the waveguide cores 42, 44 and waveguide coupler 46 are located in a different level over the SOI wafer than the waveguide cores 12, 14 and waveguide coupler 16.

The waveguide cores 42, 44 and waveguide coupler 46 are arranged along a longitudinal axis 52 with the waveguide core 42 in direct contact with a taper 48 of the waveguide coupler 46 and the waveguide core 44 in direct contact with a taper 50 of the waveguide coupler 46. The waveguide cores 42, 44 with the waveguide core 42 being wider than the waveguide core 44, the tapers 48, 50 are directly connected with each other, and the tapers 48, 50 are positioned between the waveguide core 42 and the waveguide core 44 in order to connect the waveguide cores 42, 44. The tapers 48, 50 may be directly connected with the respective waveguide cores 42, 44.

The waveguide cores 42, 44 and waveguide coupler 46 are formed after the layers 32, 34, 36 of the heterogenous layer stack are formed. To that end, the waveguide cores 42, 44 and the tapers 48, 50 of the waveguide coupler 46 may be concurrently formed by depositing a uniformly-thick layer of a material on the dielectric layer 36 and patterning the deposited layer with lithography and etching processes. To that end, an etch mask is formed by a lithography process over the deposited layer, and unmasked sections of the deposited layer are etched and removed with an etching process, such as reactive ion etching. The etching process may be selected to stop on the material of the dielectric layer 36 after penetrating partially through the deposited dielectric layer to define a slab layer 54 that is similar to the slab layer 28. The dielectric layer 38 and the back-end-of-line stack 40 are subsequently formed over the waveguide cores 42, 44 and waveguide coupler 46.

In an embodiment, the waveguide cores 42, 44 and waveguide coupler 46 may be composed of a dielectric material. In an embodiment, the waveguide cores 42, 44 and waveguide coupler 46 may be composed of silicon nitride. In embodiments, the waveguide cores 42, 44 and waveguide coupler 46 may be composed of a different dielectric material, such as silicon oxynitride, or aluminum nitride, or may be composed of a III-V semiconductor material.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a first straight waveguide core having a first width;
a second straight waveguide core having a second width less than the first width; and
a waveguide coupler including a first taper and a second taper that are positioned between the first straight waveguide core and the second straight waveguide core, the second taper directly connected with the first taper, the first taper directly connected with the first straight waveguide core, the second taper directly connected with the second straight waveguide core, and the second taper positioned between the first taper and the second straight waveguide core; and
a slab layer directly connected with the second taper, wherein the first straight waveguide core, the second straight waveguide core, the first taper, and the second taper are arranged along a longitudinal axis, the slab layer is thinner than the second taper, the first taper narrows in a direction from the first straight waveguide core to the second straight waveguide core, and the second taper narrows in the direction from the first straight waveguide core to the second straight waveguide core.

2. The structure of claim 1 wherein the first taper narrows at a first angle, and the second taper narrows at a second angle that is greater than the first angle.

3. The structure of claim 1 wherein the slab layer is positioned on a buried insulator layer of a silicon-on-insulator wafer.

4. The structure of claim 1 wherein the second taper has a length between the first taper and the second straight waveguide core, and the second taper is fully connected with the slab layer along the length.

5. The structure of claim 4 wherein the first taper is not connected with the slab layer.

6. The structure of claim 1 further comprising:
a dielectric layer stack positioned over a buried insulator layer of a silicon-on-insulator wafer,
wherein the dielectric layer stack is positioned between the slab layer and the buried insulator layer.

7. The structure of claim 1 wherein the slab layer is directly connected with the second straight waveguide core.

8. The structure of claim 7 wherein the slab layer has a thickness, and the second taper and the second straight waveguide core have respective thicknesses that are each greater than the thickness of the slab layer.

9. The structure of claim 1 wherein the first straight waveguide core is configured to guide a fundamental mode and higher-order modes of an optical signal, and the second straight waveguide core is configured to guide only the fundamental mode of the optical signal.

10. The structure of claim 1 wherein the first width of the first straight waveguide core is greater than about 0.5 times a wavelength of electromagnetic radiation contained in an optical signal guided to the waveguide coupler by the first straight waveguide core, and the second width of the second straight waveguide core ranges from about 0.1 to about 0.26 times the wavelength of electromagnetic radiation contained in the optical signal.

11. The structure of claim 1 wherein the first straight waveguide core, the second straight waveguide core, the waveguide coupler, and the slab layer are comprised of single-crystal silicon.

12. The structure of claim 1 wherein the first straight waveguide core, the second straight waveguide core, the waveguide coupler, and the slab layer are comprised of silicon nitride.

13. The structure of claim 1 wherein the first straight waveguide core, the second straight waveguide core, the waveguide coupler, and the slab layer are comprised of silicon oxynitride or aluminum nitride.

14. A method comprising:
- forming a first straight waveguide core having a first width;
- forming a second straight waveguide core having a second width less than the first width;
- forming a waveguide coupler including a first taper and a second taper that are positioned between the first straight waveguide core and the second straight waveguide core; and
- forming a slab layer connected with the second taper and the second straight waveguide core,
- wherein the first straight waveguide core, the second straight waveguide core, the first taper, and the second taper are arranged along a longitudinal axis, the second taper is positioned between the first taper and the second straight waveguide core, the slab layer is thinner than the second taper and thinner than the second straight waveguide core, the second taper is directly connected with the first taper, the first taper is directly connected with the first straight waveguide core, and the second taper is directly connected with the second straight waveguide core.

15. The method of claim 14 wherein the first straight waveguide core, the second straight waveguide core, the slab layer, and the waveguide coupler are formed by lithography and etching processes from a layer comprised of a single-crystal semiconductor material.

16. The method of claim 14 wherein the first straight waveguide core, the second straight waveguide core, the slab layer, and the waveguide coupler are formed by lithography and etching processes from a layer comprised of a dielectric material.

* * * * *